Nov. 21, 1967 S. SIMONETTI 3,353,797
MIXING SYSTEM

Filed July 8, 1964 3 Sheets-Sheet 1

INVENTOR.
SERGIO SIMONETTI
BY Thomas F. Moran
ATTORNEY

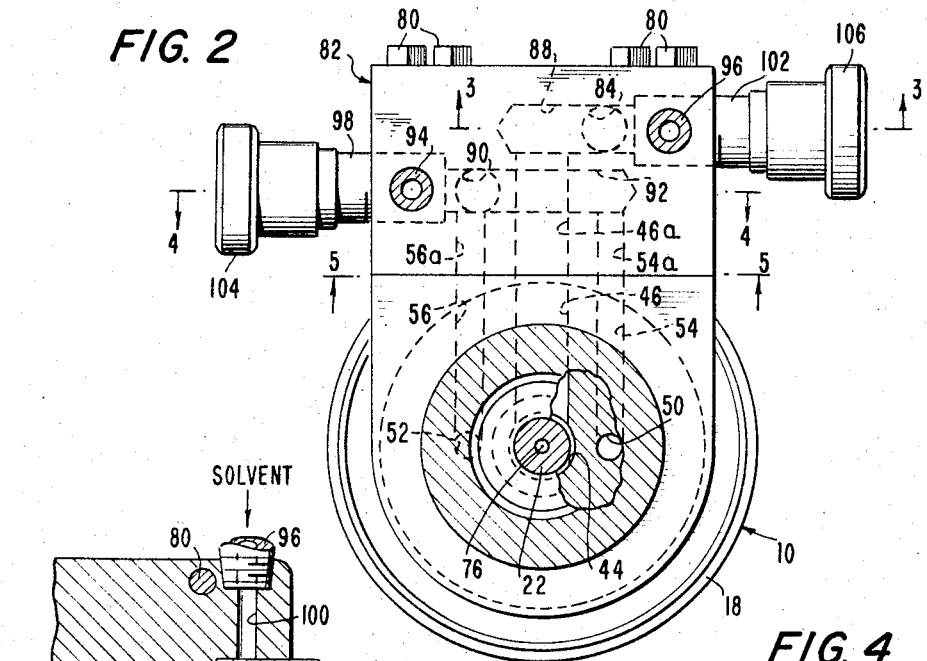
FIG. 2
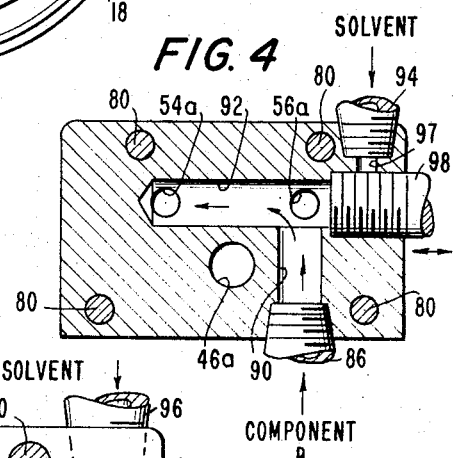
FIG. 3
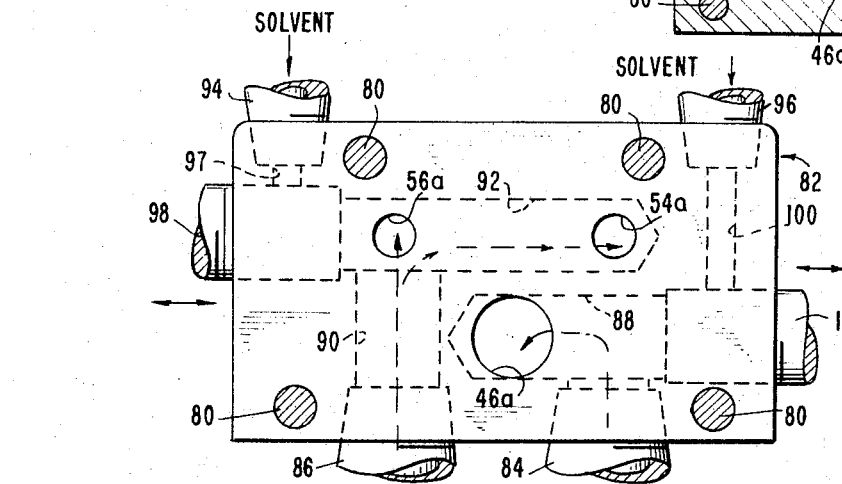
FIG. 4
FIG. 5
INVENTOR
SERGIO SIMONETTI
BY Thomas F. Moran
ATTORNEY INVENTOR.
SERGIO SIMONETTI
BY Thomas F. Moran
ATTORNEY

United States Patent Office

3,353,797
Patented Nov. 21, 1967

3,353,797
MIXING SYSTEM
Sergio Simonetti, Stamford, Conn., assignor to Sonic Engineering Corporation, Norwalk, Conn., a corporation of Connecticut
Filed July 8, 1964, Ser. No. 381,020
5 Claims. (Cl. 259—8)

This application is a continuation-in-part of my copending application Ser. No. 366,071 filed May 8, 1964, for Mixing Apparatus and assigned to the assignee of the present application.

This invention relates to the mixing of materials, and more particularly to the mixing of reactive materials which set up or harden when mixed together.

The invention finds particular application in the mixing together of liquids which form a thermosetting resin mixture that becomes a solid within a relatively short time after the formation of the mixture. The handling of such materials to form the mixture presents many problems, particularly because of the hardening of the mixed product.

Accordingly, it is an object of the present invention to provide for the mixing of materials, and particularly reactive materials.

It is another object of the present invention to provide for the easy cleaning as well as overhauling of the mixing apparatus.

These objects are achieved in the present invention through the use of a housing which defines a mixing chamber. A mixing member is positioned within the chamber and is driven by a drive shaft which extends into the chamber through a passage in the housing. The housing includes a first inlet which communicates with the shaft passage so that one of the materials to be mixed may be applied through the inlet to the shaft passage to flow around the drive shaft and into the mixing chamber. One or more other inlets are provided in the housing which communicate with the mixing chamber adjacent the shaft passage and which supply one or more other materials to the chamber to be mixed. Within the mixing chamber the mixing member mixes together the materials, which then flow from the chamber as a mixed product through an outlet provided in the housing.

By incorporating the passage for the drive shaft as one of the inlets to the mixing chamber, the shaft is continuously surrounded by one of the materials to be mixed. This material which flows into the chamber prevents any of the mixed product within the chamber from flowing back along the shaft and setting up or hardening, as in the case of a thermosetting resin mixture, which could cause a binding of the shaft.

A closure valve is provided to close the outlet from the mixing chamber, when desired, and to prevent dripping. In the past, elaborate arrangements have been required to provide such a control over the flow of mixed product through the outlet. In the present invention, a unique closure valve is provided. In particular, the valve is mounted on the mixing member adjacent the outlet. The valve includes a diaphragm which communicates with a passage through the drive shaft of the mixing member. The diaphragm normally biases the closure valve away from the outlet. When it is desired to close the outlet, fluid pressure is supplied to the passage through the drive shaft, thus actuating the valve to close off the outlet. Such a closure valve arrangement has the advantages of virtually instantaneous control through fluid pressure, fixed orientation with respect to the outlet without requiring outside mounting members, and simple coupling (by virtue of fluid pressure) between a control mechanism and the valve which requires no elaborate mechanical linkages or the like.

The mixing device is adapted to be cleaned periodically by a solvent. To this end, a liquid solvent is blown through the inlet lines into the housing. The solvent is contained within a container which is pressured by a gas, such as air, which forces the solvent through the inlet lines and into and out of the mixing chamber. When the quantity of solvent in the container is exhausted, the gas under pressure then passes through the inlet lines and into and out of the chamber to dry these lines as well as the chamber and to remove all traces of solvent. The entire apparatus is thus readied for another mixing operation. It will be noted that the gas serves the dual function of pumping the solvent and drying the device following cleaning.

The solvent cleaning arrangement advantageously incorporates a reservoir which feeds the solvent container through a conduit containing a check valve. Whenever the container is pressurized, the check valve closes and prevents any further solvent from entering into the container from the reservoir. The gas under pressure then forces the solvent in the container into the inlet lines and into and out of the mixing chamber to clean and to dry the lines and the chamber. In this fashion, discrete quantities of solvent can be used to clean the inlet lines and the mixing chamber.

The mixing device is adapted to be attached to a manifold which contains solvent and material inlets. The manifold includes a valving arrangement to channel the materials to be mixed or the solvent to the mixing device. Additionally, the material supply system is arranged so that the materials may be circulated continuously adjacent the manifold. In this fashion, following the cleaning of the mixing device or at an initial mixing operation, the materials to be mixed are immediately present and there is no delay in the supplying of materials to the device.

The above objects and features will be more completely understood by reference to the following detailed description, which includes the accompanying drawings. In the figures of the drawings:

FIG. 2 is a partially sectional top view of the mixing device shown in FIG. 1, with certain of the parts shown broken away;

Figure 6:
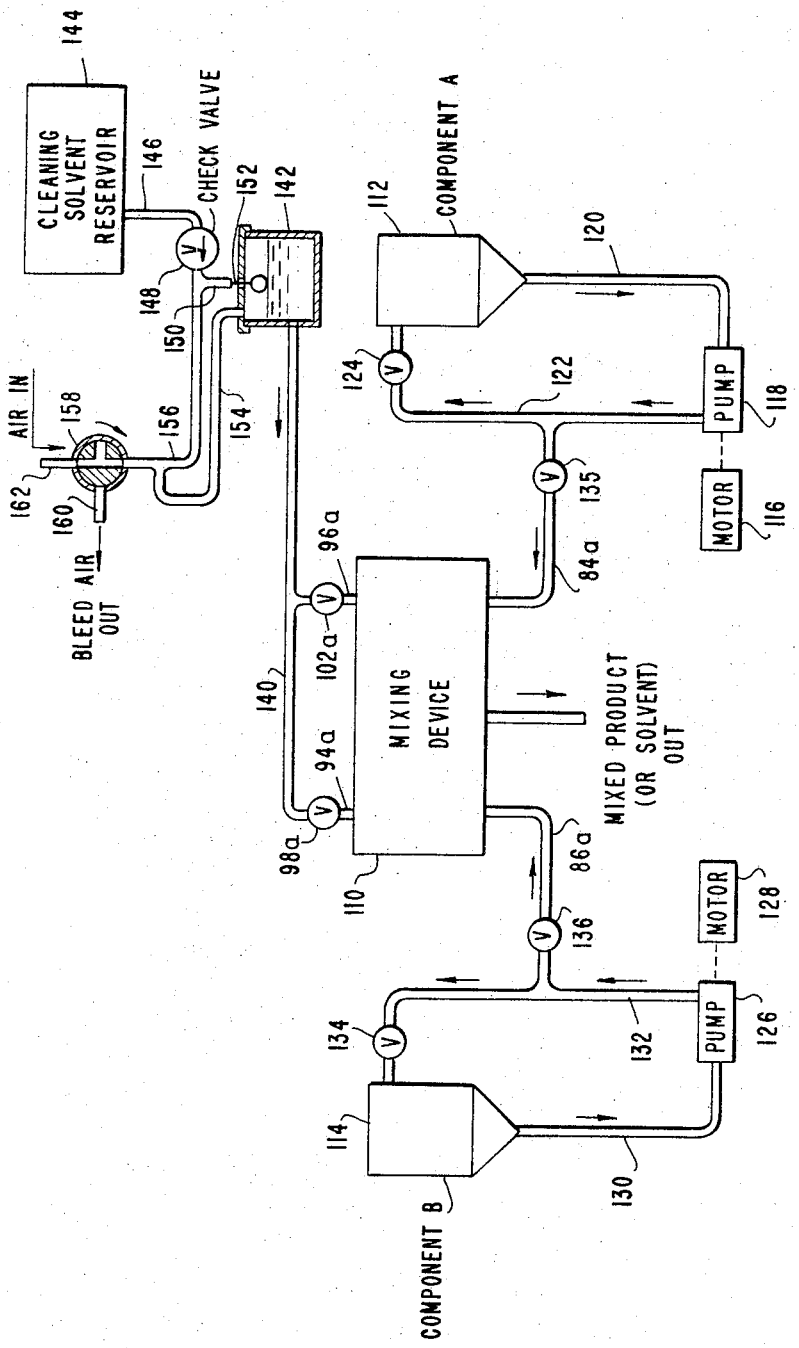

FIGS. 3, 4 and 5 are sectional views of the apparatus shown in FIG. 2, taken generally along the section lines 3—3, 4—4 and 5—5 of FIG. 2 and looking in the directions of the arrows, with FIG. 5 being drawn to a larger scale; and FIG. 6 is a diagram of a system in accordance with the invention.

Figure 1:
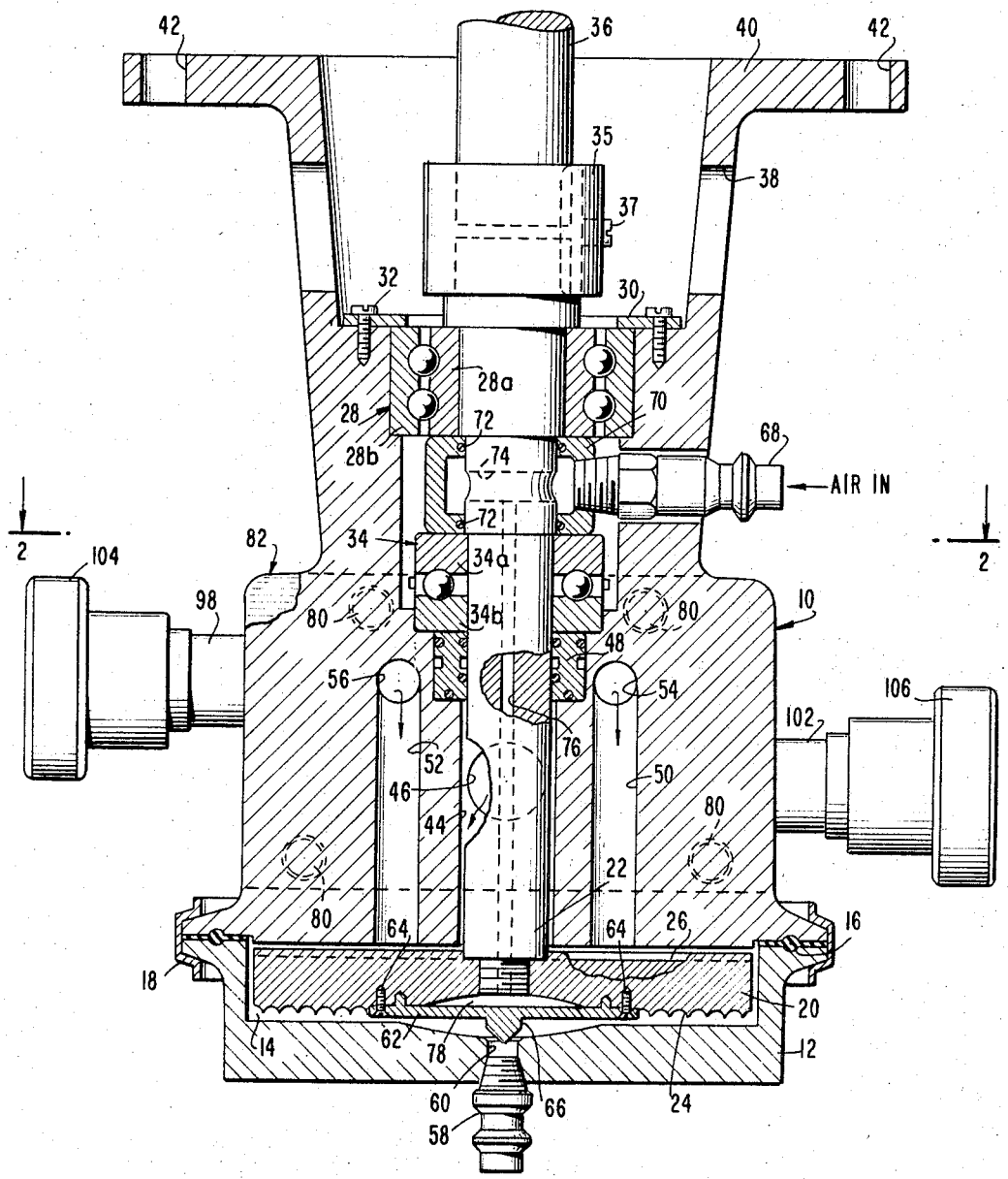
FIG. 1 is a sectional view of a mixing device in accordance with the invention, with certain of the parts shown broken away.

Referring now to FIG. 1, which shows a mixing device in accordance with the invention, the apparatus includes a housing 10 which, together with a cover 12, defines a mixing chamber 14. The cover 12 is sealed to the housing 10 by means of a gasket 16, and a clamp 18, the same as that shown and described in detail in my copending application Ser. No. 366,071, is utilized to clamp together the housing 10 and the cover 12.

A mixing member 20 in the form of a wheel is positioned within the mixing chamber 14 and is attached to a drive shaft 22, typically by being threaded onto the end of the shaft. The mixing wheel 20 may be grooved on its lower face as at 24 and along its upper face as at 26 to enhance the mixing action, all as described in my copending application Ser. No. 366,071.

The shaft 22 is mounted for rotation in a conventional roller bearing 28, of which inner race 28a is secured to the shaft 22 and outer race 28b is secured to the housing 10. A retaining ring 30 secured by screws 32 threaded into the housing 10 maintains the outer bearing race 28b in place. A further thrust bearing 34 is included of which upper race 34a is secured to shaft 22 and lower race 34b is secured to the housing 10. The shaft 22 is joined by a shaft coupling 35 to another shaft 36; the coupling includes set screw 37 accessible through opening 38 in the housing 10. The shaft 36 is driven by any conventional motor (not shown).

The housing 10 is flanged at its upper portion, as at 40, and contains bolt holes 42 through which bolts (not shown) pass to secure the housing to a conventional frame (not shown) which houses the motor that drives the shaft 36. The shaft 36 is thus driven to drive the shaft 22 to rotate the mixing wheel 20.

In the mixing of liquids, one of the liquids is supplied to the mixing chamber 14 through passage 44 which contains the drive shaft 22. Another passage 46 at right angles to the drive shaft passage 44 communicates with this passage, as shown in the broken away portion of FIG. 1 and in FIG. 2. The liquid flows as shown by the arrow in FIG. 1 out of the passage 46 and into the shaft passage 44. The material flows around the shaft 22 and downwardly into the mixing chamber 14. An O-ring seal 48 positioned around the shaft 22 above the passage 46 seals the top portion of the shaft passage 44 and prevents the material from flowing upwardly beyond this portion of the drive shaft.

The other liquid flows into the mixing chamber 14 through each of two passages 50 and 52 positioned on both sides of the shaft passage 44. The passages 50 and 52 communicate respectively with passages 54 and 56 at right angles thereto, as shown also in FIG. 2. This other liquid thus is caused to flow through the passages 54 and 56 and thence downwardly, as shown by the arrows in FIG. 1, into the passages 50 and 52, respectively, and into the mixing chamber 14.

Within the chamber, the mixing wheel 20 rotates and causes the fluids to be mixes together. Different mixing speeds are available by varying the driving speed of the shaft 22. When the liquids mixed are reactive together, for example when they comprise a thermosetting resin which hardens a short time after the mixture is formed, it is essential that none of the mixture be allowed to enter into the shaft passage 44 so as to harden therein and bind the shaft 22. By incorporating the shaft passage as one of the inlets that carries one of the reactive liquids, this is effectively prevented. The liquid component flowing through the shaft passage 44 by itself has no tendency to harden, and the flow prevents any of the mixture formed within the chamber 14 from proceeding along the shaft. Even without periodic cleaning, then, the flow of one of the components to the mixing chamber ensures that the rotating shaft will not become bound by the hardening mixture.

By the action of the rotating mixing wheel 20, the mixture is caused to flow through an outlet member 58 threaded into an opening 60 in the cover 12. A closure valve 62 in the form of a diaphragm is fastened to the mixing member 20 by screws 64. The diaphragm includes a projection 66 which is adapted to seat upon a correspondingly formed portion of the outlet 60 in the housing cover 12. The closure valve 62 is normally in the position shown in FIG. 1 by virtue of the action of the diaphragm, and in this position the protruding portion 66 does not seal off the outlet, allowing the mixed fluid to flow out of the outlet member 58.

If it is desired to close off the outlet member 58, fluid under pressure, such as air, is applied to a fitting 68 threaded into a retaining ring 70 through which the shaft 22 rotates. The ring 70 is sealed from the shaft by O-rings 72. Air flows through the coupling 68 and ring 70 and into passage 74 in the shaft 22 which communicates with another passage 76 that extends downwardly through the shaft. The passage 76 opens into a space 78 at the end of the shaft above the closure valve 62. The air pressure thus forces the valve downwardly, causing the protrusion 66 to seat within the opening 60 and to close off the outlet member 58. Whenever it is desired to open the outlet, the air pressure applied to the coupling 68 is removed, allowing the valve 62 to spring upwardly.

The closure valve 62 provides an advantageous arrangement for sealing the outlet member 58. By mounting the valve on the rotating mixing member 20, the valve is always oriented properly with respect to the outlet. Providing the valve in the form of a diaphragm permits it to be actuated easily by fluid pressure, which simplifies the control arrangement and avoids complicated mechanical linkages for valve actuation.

As shown in FIGS. 1 and 2, the housing 10 is adapted to be bolted by bolts 80 to a manifold 82. The manifold is most clearly shown in FIGS. 2–5 and serves to channel two materials, as well as a solvent, into the inlet passages 46, 54 and 56 in the housing 10. As shown in FIG. 5, a material to be mixed, designated component A, is applied via a conduit 84 to the manifold 82. The other material, designated component B, is applied via a conduit 86 to the manifold. Within the manifold, a passage 88 links the conduit 84 to a pasage 46a which communicates with the passage 46 in the housing 10 (FIGS. 2 and 5). Similarly, the conduit 86 containing component B is coupled by passages 90 and 92 to passages 54a and 56a which respectively communicate with passages 54 and 56 in the housing 10. FIG. 4 is a view similar to FIG. 5, looking in a direction 180° from that in FIG. 5, showing the conduit 86 and the passages 90, 91, 54a and 56a.

Solvent is also applied to the manifold 82, as shown in FIG. 5, through conduits 94 and 96. The solvent conduit 94 communicates via a passage 97 and past a valve plug 98 with the passage 92 connected to the passages 54a and 56a. Similarly, the solvent conduit 96 communicates via a passage 100 and past a valve plug 102 with the passage 88 connected to the passage 46a. The valves 98 and 102 are typically threaded into the manifold 82 and are actuated to close or open the passages 97 and 100, respectively, by suitable rotation of valve handles 104 and 106, respectively (FIG. 2).

For example, when the valve plug 98 is moved to the left in FIG. 5 (to the right in FIG. 4), the solvent passage 97 is unblocked and allowed to connect with the passage 92. Hence solvent is free to flow from the conduit 94 through the passages 97 and 92 as well as the connecting passages 56a and 54a out of the manifold and into the passages 56 and 54, respectively (FIG. 1), in the housing 10 to flush the passages 50 and 52 and the chamber 14. FIG. 4 also shows the action of the valve plug 98.

In the same fashion, the valve plug 102 may be moved to the right in FIG. 5 (see also FIG. 3) to connect the passages 100 and 88 to permit solvent to flow from the solvent line 96 through these passages and into the passage 46a which connects with the passage 46 in the housing 10. Solvent thus flows through the passage 46 (FIG. 1) and downwardly in the shaft passage 44 past the shaft 22 to clean this passage and to flow into the chamber 14 to aid the solvent from the passages 50 and 52 also flowing into the chamber to clean the chamber. Solvent flows out of the chamber through the outlet member 58.

During the time that solvent is allowed to flow into the manifold 82 by suitable actuation of the valve plugs 98 and 102, the material conduits 84 and 86 are closed by suitable valves (described later in connection with FIG. 6) so that the solvent cannot flow back through these conduits and into the sources of material supply.

FIG. 6 shows a system typically incorporating the mixing device of FIGS. 1–5, suitable for mixing together two components and for cleaning the mixing device with a solvent. A mixing device 110 corresponding to the device 10 shown in FIG. 1, for example, mixes two liquids designated component A and component B contained respectively within containers 112 and 114. A pump 118 driven by a motor 116 pumps the liquid component A through a loop formed from conduits 120 and 122. A valve 124 is advantageously positioned within the conduit 122. Similarly, a pump 126 driven by a motor 128 pumps the liquid component B through a loop formed from conduits 130 and 132. A valve 134 is advantageously included in the conduit 132.

A conduit 84a, corresponding to the conduit 84 of FIG. 5, couples the conduit 122 to the mixing device 110 through a valve 135. Similarly, a conduit 86a, corresponding to the conduit 86 in FIG. 5, connects the conduit 132 to the mixing device 110 through a valve 136.

If the mixing device 110 is not in operation, the valves 135 and 136 are closed. The valves 124 and 134 are typically open, however, and the pumps 118 and 126 continuously pump fluid through the respective conduit loops 120, 122 and 130, 132. When it is desired to supply components A and B to the mixing device 110, the valves 135 and 136 are opened. Because of the circulation of fluid through the conduit loops just described, fluid is continuously present at the valves and thus flows immediately through the conduits 84a and 86a to the mixing device. When the valves 135 and 136 are opened, the valves 124 and 134 are normally concurrently closed.

During the time that the components A and B are supplied to the mixing device, solvent valves 98a and 102a, which correspond respectively to the valve plugs 98 and 102 in FIG. 5, are closed. These valves are shown in FIG. 6 as positioned within solvent conduits 94a and 96a which correspond respectively to the conduits 94 and 96 in FIG. 5. In FIG. 6, the valves 98a and 102a are coupled to a conduit 140 which is connected to a container 142 containing solvent therein. The solvent in the container is supplied from a solvent reservoir 144 connected to the container 142 through a conduit 146, a check valve 148 and a conduit 150 which serves as an inlet to the container. The check valve allows fluid to flow only in the direction indicated by the arrow in the valve from the reservoir 144 into the container 142. A float operated valve 152 closes the inlet line 150 when the level of fluid in the container 142 reaches a predetermined height. An air bleed line 154 passes from the top of the container 142 to a conduit 156 which is connected to a three-way valve 158. When the valve 158 is rotated clockwise as shown in FIG. 6 to occupy the second of its two positions (the valve is illustrated in its first position), the conduit 156 and the bleed line 154 are coupled to a bleed air outlet 160. Thus in the second position of the valve, air within the container 142 is free to pass through the bleed line 154 and conduit 156 and thence through the three-way valve 158 to be discharged into the atmosphere. Evacuation of air from the container 142 permits solvent to flow freely from the reservoir 144 through the inlet line 150 and into the container.

When it is desired to clean the mixing device 110 with solvent from the container 142, the valves 135 and 136 are closed, shutting off the flow of components A and B to the mixing device. The valves 124 and 134 are normally opened to circulate the components A and B through the loop conduits 120, 122 and 130, 132 as described above. The solvent valves 98a and 102a are next opened, and the three-way valve 158 is switched to its first position as shown in the figure. In this position of the valve, gas under pressure, such as air, is applied to an inlet line 162. The gas flows through the valve 158 and into the conduits 154 and 156. The conduit 156 communicates with the check valve 148, and the gas under pressure closes this valve, preventing solvent from flowing out of the reservoir 144 and into the container 142 as long as pressure is maintained in the conduit 156. The gas in the conduits 154 and 156 enters the container 142 and forces the solvent therein through the conduit 140 and the now opened valves 98a and 102a into the mixing device 110, to clean that device as described above with reference to FIGS. 1–5. When the solvent is completely exhausted from the container 142, gas under pressure is blown through the conduit 140 and into the mixing device to force all solvent from the device and to dry the device. The gas pressure is continued for as long as necessary to ensure proper drying.

Following the drying step, the valves 98a and 102a may again be actuated to close the solvent lines 94a and 96a, and the mixing device is readied for another mixing operation. It will be noted, however, that following the discharge of solvent from the container 142, the container may be partially filled if desired by temporarily switching the valve 158 to its second position coupling the bleed air outlet 160 to the conduit 156 and allowing solvent to partially fill the container 142. Next the valve 158 is again switched to the position shown in the figure coupling the gas under pressure to the conduit 156 and forcing the solvent from the container 142 into the mixing device. It is apparent that each time the gas pressure is applied to the conduit 156 the check valve 148 is closed, preventing further solvent from flowing into the reservoir 142. Thus alternately pressurizing and depressurizing the container permits selected batches of solvent to be forced from the container into the mixing device for cleaning.

It will be noted that the gas operated cleaning arrangement shown in FIG. 6 is advantageous since the gas serves the dual function of pumping the solvent through the mixing device as well as drying the mixing device after the solvent from the container 142 has been exhausted. This avoids the use of a pump which would normally be required.

It will be noted from the above description that preferred embodiments of the invention have been provided which facilitate the mixing together of two or more fluids as well as the periodic cleaning of the mixing device. The device shown in FIGS. 1–5, while susceptible of easy cleaning by the solvent cleaning arrangement shown in FIG. 6, is also susceptible of easy dismantling so that it may be removed entirely for a complete overhauling if desired. To this end, the housing 10 is unbolted from the manifold 82 (FIG. 2) by removing the bolts 80. Next, the motor shaft 36 is decoupled from the drive shaft 22 (FIG. 1) by unscrewing the screw 37 on the shaft coupling 35 which connects the two shafts together. The screw 37 is easily accessible, as pointed out above, through the opening 38 in the housing 10. Following this, the housing 10 is unbolted from the frame to which it is connected by removing the bolts (not shown) that pass through the bolt holes 42 in the flanged portion 40 of the housing. With this simple procedure, the entire housing 10 may be removed.

It will be appreciated that the preferred embodiments of the invention disclosed above are susceptible of modifications which fall within the spirit of the invention. Accordingly, the invention should be taken to be defined by the following claims.

What is claimed is:

1. In apparatus for operating upon a material, the combination comprising a housing defining an operating chamber, an operating member positioned within the chamber, a shaft extending into the chamber and coupled to the operating member for driving the operating member, said housing including an outlet from said chamber, said shaft including a fluid passage, and means in communication with the fluid passage and positioned adjacent said outlet to be actuated by fluid in the fluid passage for selectively opening and closing the outlet.

2. Apparatus as defined in claim 1, wherein said operating chamber is a mixing chamber and said operating member is a mixing member for mixing together fluids supplied to the chamber for mixing.

3. In apparatus for mixing together a plurality of materials, the combination comprising a housing defining a mixing chamber, a mixing member positioned within the chamber for mixing the materials, a shaft extending into the chamber through a passage in the housing and coupled to the mixing member for driving the mixing member, said housing including a plurality of inlets for introducing the materials to be mixed into the chamber and an outlet for discharging the mixed product from the chamber, one of the inlets communicating with said passage for introducing one of the materials at the shaft and through the passage into the mixing chamber, valve means carried on the mixing member for selectively opening and closing the outlet, a manifold coupled to the housing and including a plurality of outlets in communication with the inlets of the housing, said manifold including a plurality of material inlets and at least one solvent inlet all communicating with the outlets in the manifold for selectively applying materials to be mixed and a cleaning solvent to the housing, a container for holding a quantity of solvent, a conduit coupling the container to the solvent inlet of the manifold, means for applying a gas under pressure to the container to force the solvent within the container out of the container and through the conduit into the manifold and into and out of the mixing chamber to clean the mixing chamber with solvent following which gas under pressure passes through the conduit to dry those parts cleaned by the solvent, said shaft including a fluid passage in communication with said valve means, and means for supplying fluid to said fluid passage for selectively actuating said valve means.

4. Apparatus as defined in claim 3, including means for circulating the materials to be mixed past the inlets of said housing.

5. Apparatus as defined in claim 4, including a reservoir for supplying the container with solvent, a further conduit coupling together the reservoir and the container, and a check valve positioned within the further conduit permitting solvent to flow only from the reservoir into the container and being closed by said gas under pressure to prevent solvent from flowing from the reservoir into the container while the gas under pressure is applied to the container.

References Cited
UNITED STATES PATENTS

| | | | |
|---|---|---|---|
| 1,101,199 | 6/1914 | Legg et al. | 259—44 |
| 1,827,301 | 10/1931 | Smith et al. | 134—102 |
| 2,847,196 | 8/1958 | Franklin et al. | 259—8 |
| 2,886,281 | 5/1959 | Canalizo | 251—57 |
| 2,919,704 | 1/1960 | Butler | 134—102 |
| 3,026,183 | 3/1962 | Cole | 259—7 X |
| 3,051,455 | 8/1962 | Magester | 259—8 |
| 3,120,128 | 2/1964 | Snyder. | |
| 3,141,865 | 7/1964 | McEvoy | 259—8 X |
| 3,206,171 | 9/1965 | Levake | 259—8 |
| 3,207,486 | 9/1965 | Rosenthal | 259—8 |
| 3,212,128 | 10/1965 | Carlson et al. | 259—7 X |

WALTER A. SCHEEL, *Primary Examiner.*

J. M. BELL, *Assistant Examiner.*